United States Patent [19]
Gendron et al.

[11] 3,859,022
[45] Jan. 7, 1975

[54] HIGH SPEED DOUGH DIVIDER WITH FERMENTATION GAS VENTS

[75] Inventors: Roger J. Gendron, Bridgeport; Harvey E. Plant, Saginaw, both of Mich.

[73] Assignee: Baker Perkins Inc., Saginaw, Mich.

[22] Filed: Mar. 1, 1974

[21] Appl. No.: 447,162

Related U.S. Application Data

[63] Continuation of Ser. No. 307,271, Nov. 16, 1972, abandoned.

[52] U.S. Cl. ............................... 425/203, 425/241
[51] Int. Cl. ............................... A21c 5/04
[58] Field of Search .......... 425/203, 239, 241, 812, 425/DIG. 60; 426/503, 504, 519

[56] References Cited
UNITED STATES PATENTS

| | | | |
|---|---|---|---|
| 1,431,718 | 10/1932 | Blum | 425/241 |
| 3,137,029 | 6/1964 | De Zolt | 425/241 |

FOREIGN PATENTS OR APPLICATIONS

| | | | |
|---|---|---|---|
| 327,998 | 3/1972 | U.S.S.R. | 425/203 |

*Primary Examiner*—Francis S. Husar
*Assistant Examiner*—David S. Safran
*Attorney, Agent, or Firm*—Learman & McCulloch

[57] ABSTRACT

A dough dividing machine which has a rotary divider head with a plurality of peripherally spaced, peripherally opening, dough receiving chambers for rapidly and accurately dividing dough into individual pieces; a dough supplying screw pump for supplying dough at a substantially constant pressure to at least one of the chambers at a dough supplying station past which the dough receiving chambers move when the divider head is rotated; and dough ejecting pistons successively movable in the chambers between radially inner, dough receiving positions, at the dough supplying station, and radially outer, dough ejecting positions at the dough discharging station to sequentially discharge the dough from the chambers in individual pieces.

3 Claims, 4 Drawing Figures

PATENTED JAN 7 1975
3,859,022
SHEET 1 OF 2
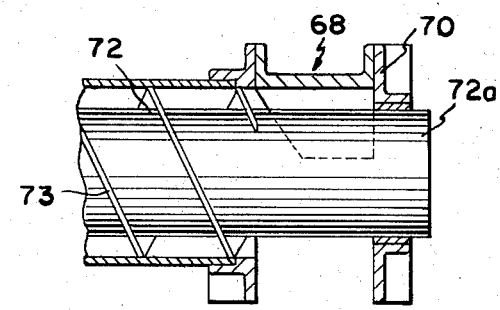
FIG.IA
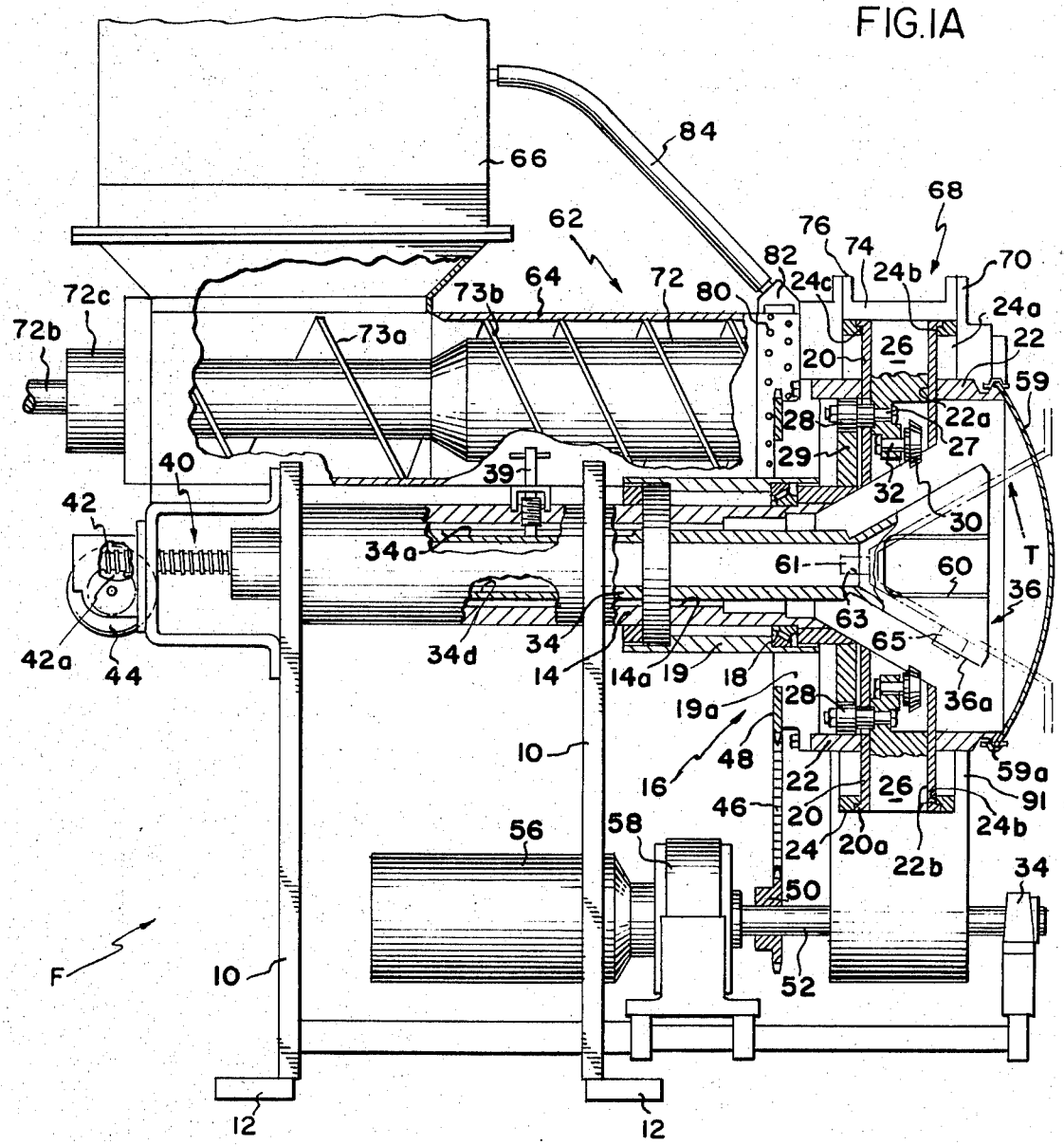
FIG.I

HIGH SPEED DOUGH DIVIDER WITH FERMENTATION GAS VENTS

This is a continuation of application Ser. No. 307,271, filed in the United States Patent Office on Nov. 16, 1972, now abandoned.

BACKGROUND OF THE INVENTION

This invention relates to a dough divider, and more particularly to a dough divider which is adjustable to provide dough pieces in a range of desired sizes and which will provide a more uniformly scaled dough product at a higher rate of production than present machines.

Conventional dough dividers, incorporating rotary dough divider heads with dough scaling chambers, utilize a dough supplying, external, reciprocable piston which moves toward and away from the dough receiving chambers to force dough thereto at pressures which vary during the piston's stroke. As the dough feeding reciprocable piston moves toward the dough divider head to press the dough into a chamber, an increasing pressure is exerted on the dough and as the piston withdraws, the pressure exerted on the dough is gradually relieved. Such surge feeding does not provide as uniformly scaled a product as desirable and also necessitates a higher peak power to drive the dough dividing machine. Accordingly, an object of the present invention is to provide a dough divider which forces dough into the chambers at a relatively constant pressure which insures uniformly scaled products.

In conventional machines, during the time the dough supplying piston is withdrawn, dough cannot be delivered to the dough chambers and the output of the conventional dough divider is limited accordingly. Thus, it is another object of the present invention to provide a machine which operates differently and permits the speed of dividing dough into individual pieces to be increased.

Conventional dough dividers deliver dough to only one scaling chamber at a time. If dough continues to be forwarded toward a dough divider head after a chamber is full and before an empty chamber is moved to the dough supplying station, the pressure of the dough in the supplying chamber will build and, when the succeeding chamber is moved to the dough supplying station, dough will be supplied to the succeeding dough chamber at a higher pressure. This also contributes to the production of non-uniformly scaled products. Accordingly, it is another object of the present invention to provide a dough divider head having a plurality of dough receiving pockets or chambers therein communicating with apparatus for continuously supplying dough to at least one of the pockets at all times.

With conventional dough dividers, the dough must be thoroughly mixed prior to being supplied to the dough divider. Apparatus constructed according to the present invention incorporates a screw for forwarding the dough toward the dough receiving chambers. The screw provides a kneading or mixing action and thus slightly undermixed dough can be supplied to a dough divider constructed according to the present invention. Accordingly, it is another object of the present invention to provide a dough divider which can accept slightly undermixed dough and thus decrease the overall production time.

Breadmakers are continually seeking ways to eliminate void creating fermentation gases in the bread dough. A piece of bread dough of a given volume, having voids therein, will weigh substantially less than a piece of bread dough without voids. Accordingly, a further object of the present invention is to provide a dough divider constructed to eliminate fermentation gases from dough product.

Another object of the present invention is to accurately divide dough and other material into pieces within a viscosity range of 30,000 – 100,000 centipoises at a rate between 50 pieces per minute and 240 pieces per minute, for bread, and at considerably higher speeds for buns.

It is yet another object of the present invention to provide a dough divider having dough scaling chambers and dough scaling pistons therein which are easily disassembled for cleaning to meet ever more stringent sanitation requirements.

Other objects and advantages of the present invention will become apparent to those of ordinary skill in the art as the description thereof proceeds.

SUMMARY OF THE INVENTION

A machine for rapidly and accurately dividing dough into individual pieces, including a rotary divider head having a plurality of dough receiving cylinders therein, dough ejecting pistons movable in the cylinders between inner dough receiving positions at a dough supplying station and outer dough ejecting positions at a dough discharge station downstream thereof, and a dough pump at the dough supplying station for supplying dough to at least one of the chambers at a substantially constant pressure.

The present invention may more readily be understood by reference to the accompanying drawings, in which:

FIG. 1 is a partly sectional, side elevational view of dough dividing apparatus constructed according to the present invention;

FIG. 1A is a vertical sectional view of the dough pump only, taken along the line 1A—1A of FIG. 2;

DESCRIPTION OF THE PREFERRED EMBODIMENT

Figure 3:
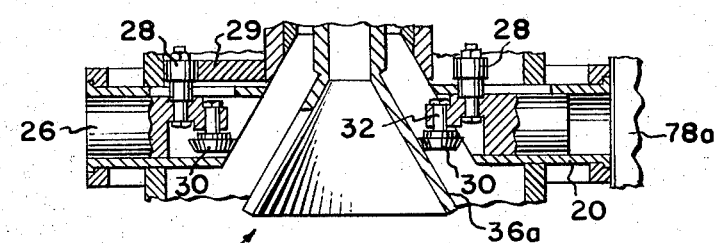
FIG. 3 is a sectional, fragmentary top plan view of the rotary divider head, taken along the line 3—3 of FIG. 2.

Dough dividing apparatus constructed according to the present invention is mounted on a base or frame, generally designated F, which may include a pair of upstanding frame plates 10 mounted on floor-engaging rails 12, and supporting a generally horizontal, tubular support member 14. Roller bearings 18 are provided on the tubular support member 14 and rotatably support a rotary cylinder head, generally designated 16. The rotary cylinder head 16 includes a tubular extension member 19 journaled on the bearings 18 and having a radial flange 19a mounting an inner support drum 22, having a plurality of circumferentially spaced, radially opening bores 22a therein, receiving radially disposed, cylindrical liners or sleeves 20, defining a plurality of peripherally opening, dough receiving chambers 22b.

Figure 2:
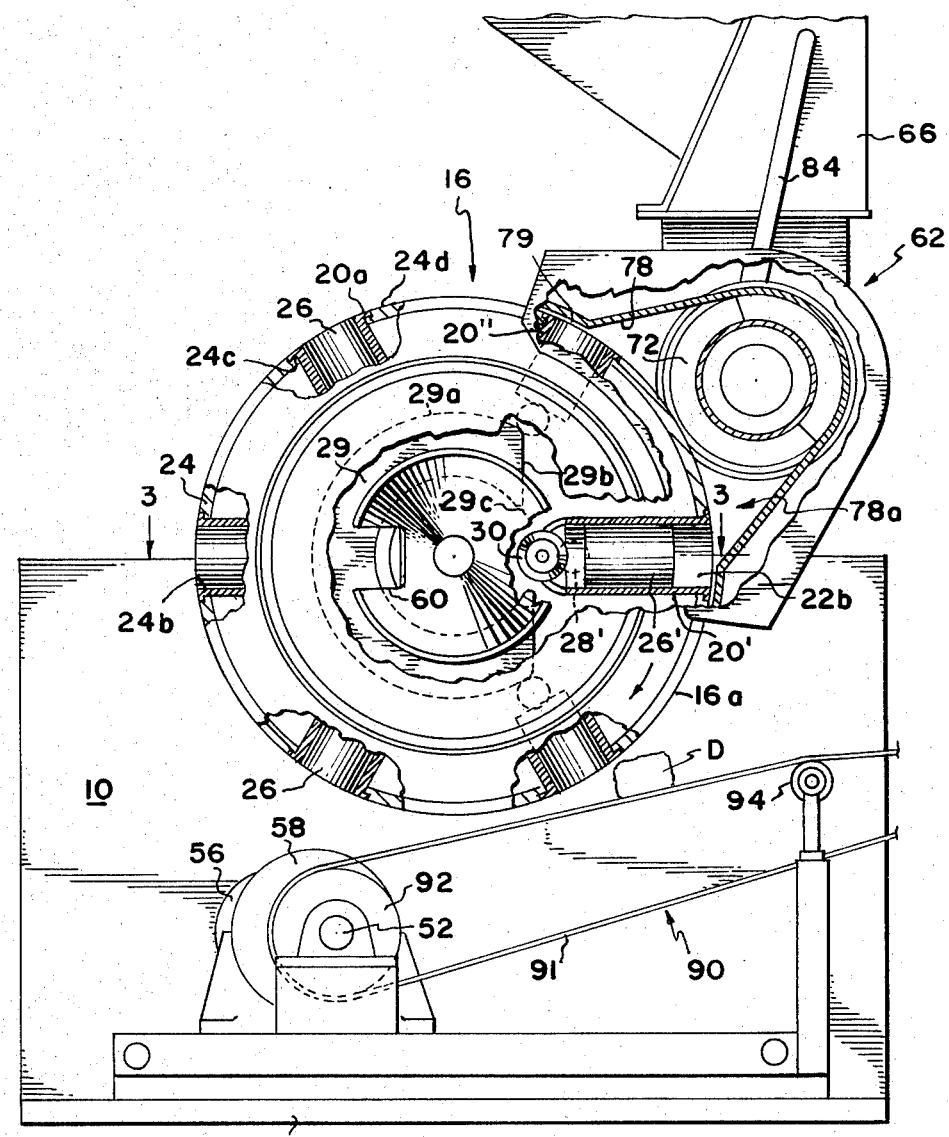
FIG. 2 is an end elevational view of the dividing apparatus illustrated in FIG. 1, part of the apparatus being broken away to more clearly illustrate other parts thereof.

An outer cylinder support drum 24 is mounted on the inner drum 22 by annular rings 24a and includes radially opening apertures 24b, in alignment with the inner drum apertures 22a, receiving the liners or sleeves 20. The recesses 24b are counter-sunk at 24c to receive the flanged heads 20a of the sleeves 20 so that the heads 20a are flush with the outer drum surface 24d (FIG. 2).

Reciprocally mounted in the chamber defining liners 20 are dough scaling pistons 26, each mounting a cylindrical follower roller 28 on a pin 27 and a tapered roller 30 on an eccentrically mounted pin 32. As the dough divider head 16 is rotated, the follower rollers 28 ride along a cam 29, having a profile as illustrated in FIG. 2, including a camming portion 29a which forces the rollers 28 and the piston 26 to the radially outermost positions and relieved portions 29b separated by a gap 29c which permits the pistons 26 to be moved to their radially innermost positions.

The tubular support shaft or housing member 14 includes a passage 14a for receiving an axially adjustable sleeve 34 having a frustoconically-shaped camming head 36. A thumb screw 39, provided in the tubular support sleeve 14, is movable into a slot 34a in the support sleeve 34 to prevent rotary movement, while permitting axial movement, of the camming head 36. An axially extending screw 40, at the opposite end of the support sleeve 34, reacts with a worm and worm gear 42 and 42a, driven by a hand-wheel 44, for moving the support sleeve 34 and frustoconical camming head 36 axially, so that the follower roller 30 will engage the peripheral outer tapered surface 36a of the camming cone 36 along different radii of the frustoconical surface.

The rotary cylinder head 16 is rotated via a chain 46 trained around a sprocket 48, fixed to the rotary head annular flange 19a, and a sprocket wheel 50 fixed to a drive shaft 52, journaled in frame supported bearings 54, driven by a motor 56 through a gear reduction unit 58.

A removable cowling 59 is removably secured to the axially outer end of the inner drum 22 by coupling members 59a to provide access to the inside of the housing. The camming head 36 includes a window or cutout 60 which is normally disposed in the position illustrated in FIG. 2. A wrench tool, illustrated in chain lines at T, is provided for rotating the head 36 from the position illustrated in FIG. 2, to a position in which the window 60 is in line with the gap 29c between the camming portions 29b to permit the dough ejecting pistons 26 to be moved radially inwardly therethrough for cleaning. The thumb screw 39 is backed out of the slot 34a prior to the camming head 36 being rotated by the tool T and is turned into another slot 34d, circumferentially spaced from the slot 34a, when the window 60 is aligned with the gap 29c. This will prevent rotation of the sleeve 34 so that the pistons can be successively removed as the cylinder head 16 is rotated. The rotating tool T includes a central stub shaft portion 61 received in a complemental aperture 63 provided in the support sleeve 34 and a tang 65 received in the window 60. Typically, the divider head 16 would include six, 4-inch pistons each having a 4½ inch stroke to provide individual dough pieces between 8 and 40 ounces depending on the axial position of camming head 36.

DOUGH SUPPLYING APPARATUS

Apparatus, generally designated 62, is provided for delivering dough to the dough divider head 16 and comprises a frame supported barrel-shaped housing 64 connected at one end to a feed hopper 66 and its outlet end to a housing 68. The housing 68 includes an end plate 70 (FIG. 1A) journaling the end 72a of a feed screw 72 having helical flights 73 thereon which forwardly advance dough from the inlet hopper 66. The flights 73 include deeper and narrower flight sections 73a and 73b of sufficient displacement for the high outputs necessary in modern bakeries. The housing 68 includes a curvilinear side wall 74 supported by the end plate 70 and an intermediate ring 76 fixed on the barrel-shaped housing 64 to form a part thereof. The side wall 74, end plate 70, and ring 76 cooperate to define a dough supplying manifold which directs dough radially inwardly toward the divider head 16. The side wall 74 has a rotary sliding clearance 79 with the rotary cylinder head 16, and directs the dough radially inwardly through a circumferential manifold opening 78 toward the dough scaling cylinders 20 at a dough supplying station or charging area 78a at the front end of the machine. It is important to note that the opening 78 is of sufficient circumferential extent that before the cylinder designated 20' (FIG. 2) leaves the dough charging area or supply station 78a, the following cylinder 20'' is in communication therewith so that dough is always being supplied to at least one of the cylinders 20.

A plurality of circumferentially spaced ports 80 are provided in the screw pump housing 64, upstream of the housing 68, to permit fermentation gases in the dough to escape to a circumferential, gas collecting ring 82 connected with a dough return line 84 communicating with the hopper 66. The return line 84 permits any dough, entrained in the gas or otherwise extruded through the ports 80, to be returned to the dough supply hopper 66. A mixture of dough and gas, which may comprise a minor portion of the dough being transported by volume and a major portion of the gas in the dough, returns to the hopper 66 via the line 84. The gases returned escape from hopper 66 out the open end thereof. In this way, the accuracy of scaling is enhanced to provide dough pieces of uniform size and weight.

The screw shaft 72 includes, at its dough supply end, a reduced shaft 72b journaled in frame supported bearings 72c and adapted to be driven by a suitable source of power (not shown) which may suitably comprise a direct current motor controlled by an electrical feedback loop responsive to a shaft speed sensor to obtain zero variation in the speed of the screw 72 so that the screw will not speed up or slow down under load.

Disposed under the scaling head 16 is a discharge conveyor, generally designated 90, including an endless belt 91 trained around pulleys 92 mounted on frame supported shafts 52 and a frame supported idler roller 94. The endless belt 91 will convey the dough pieces D to the next piece of bakery equipment (not shown) which may be a rounder.

The dough pump feed screw 72, which is continuously driven, will provide continuous mixing motion to the dough in the mixing barrel 64. Because of this mixing action, slightly undermixed dough may be supplied to the dough hopper 66.

When the scaling rollers 30 wear, the eccentrically mounted pins 32 may be rotated slightly to move the scaling rollers 30 slightly closer to the camming head 36 to maintain the volumetric capacity of the chambers 20 constant.

THE OPERATION

The dough pump screw 72 is continuously rotated to pump dough from the hopper 66 to the front of the screw housing 64 at a predetermined pressure. The dough divider head 16 is continuously rotated by the drive motor 56 at a substantially constant speed and the dough pump 62 forces the dough into the cylinder 20' (FIG. 2) moving the piston designated 26' therein radially inwardly until the tapered scaling roller 30 thereon engages the camming head 36. At this time, the cam roller 28' on the piston 26' is adjacent the relieved portions 29b and 29c of the ejecting cam 29 so that the ejecting roller 28' and the piston 26' are free to move inwardly. The extent of inward movement of the pistons 26 is controlled by the tapering rollers 30 riding on the conically-shaped head 36. Axial adjustment of the cone 36 will vary the distance that the pistons 26 are permitted to move inwardly to vary the available volumetric capacity of the cylinders 17.

In FIG. 2 the piston designated 26' is illustrated as having been moved inwardly to its radially innermost position and the cylinder designated 20' has been filled with dough at the dough supplying station. Before the chamber 20' is moved from the dough supplying station, the following dough supplying chamber, designated 20'' is moved into communication with the opening 78 in the dough supply pump 62 so that dough will always be supplied to at least one of the cylinders 20 to maintain the pressure in the dough pump 62 substantially constant. When the cylinder 20' passes downwardly beyond the shoe 76, the follower roller 28 again engages the ejecting cam 29 and the piston 26' is sharply moved outwardly to expel the dough pieces D to the discharge belt conveyor 91. A doctor blade or the like may be provided adjacent the head of the piston flush with the circumferentially outer surface 16a of the drum to sever the dough pieces D from the ends 26a of the pistons.

When the pistons 26 are to be removed for cleaning, the cowling 59 is removed and the wrench tool T is installed as illustrated in chain lines in FIG. 2. The thumb screw 39 is backed out of the slot 34a and the head 36 is rotated to a removal position in line with recess 29c. The thumb screw is then turned into the slot 34d. The head 16 is then rotated and the pistons 26 are sequentially removed through the window 60.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. Apparatus for dividing material, such as bread dough and the like, into individual pieces comprising:
    a frame;
    a rotary divider head mounted thereon and having a plurality of peripherally spaced, material-receiving, scaling chambers in its peripheral surface;
    material-supplying means for continuously, forwardly supplying material at a substantially constant pressure and density to said chambers at a material-supplying station past which said chambers move as said head is rotated, said material-supplying means comprising a dough pump device, with a driven dough forwarding element, having an outlet compartment partly peripherally surrounding said head to deliver dough to said chambers, and vent means incorporating multiple ports spaced generally around said forwarding element substantially at said outlet compartment to bleed off fermentation gases;
    material ejecting means movable in said chambers between radially inner material-receiving positions, in which material is received in said chambers at said material-supplying station, and radially outer material ejecting positions at a material discharge station downstream of said supplying station as said head is rotated to discharge the scaled material from said chambers in individual pieces; and
    means for moving said material ejecting means.

2. The dividing apparatus of claim 1 wherein said outlet compartment is of sufficient extent to span a filled chamber departing the supplying station and an unfilled chamber entering the supplying station.

3. The apparatus set forth in claim 1 wherein said vent means includes a gas-collecting manifold ring surrounding said ports and a return line connecting said ring with said material-supplying means upstream of said port means for returning gas-entrained material upstream from said port means.

* * * * *